US011099843B2

(12) United States Patent
van Schaik

(10) Patent No.: US 11,099,843 B2
(45) Date of Patent: Aug. 24, 2021

(54) DETERMINING SIMILARITY GROUPINGS FOR SOFTWARE DEVELOPMENT PROJECTS

(71) Applicant: Microsoft Technology Licensing, LLC, Redmond, WA (US)

(72) Inventor: Sebastiaan Johannes van Schaik, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 16/229,925

(22) Filed: Dec. 21, 2018

(65) Prior Publication Data
US 2019/0205128 A1 Jul. 4, 2019

Related U.S. Application Data

(60) Provisional application No. 62/611,743, filed on Dec. 29, 2017.

(51) Int. Cl.
*G06F 8/77* (2018.01)
*G06F 3/0481* (2013.01)

(52) U.S. Cl.
CPC .............. *G06F 8/77* (2013.01); *G06F 3/0481* (2013.01)

(58) Field of Classification Search
None
See application file for complete search history.

(56) References Cited

U.S. PATENT DOCUMENTS

| 5,317,741 A | 5/1994 | Schwanke | |
| 7,236,973 B2* | 6/2007 | Kalthoff | G06F 16/215 |
| | | | 707/650 |
| 7,742,939 B1* | 6/2010 | Pham | G06Q 10/06393 |
| | | | 705/7.39 |

(Continued)

OTHER PUBLICATIONS

Bardsiri, V. Khatibi, et al. "Increasing the accuracy of software development effort estimation using projects clustering." IET software 6.6 (2012): 461-473. (Year: 2012).*

(Continued)

*Primary Examiner* — Matthew J Brophy
(74) *Attorney, Agent, or Firm* — Workman Nydegger

(57) ABSTRACT

Methods, systems, and apparatus, including computer programs encoded on computer storage media, for generating similarity groupings of software projects. One of the methods includes computing respective values for a plurality of analysis metrics associated with each software development project of a plurality of software development projects, wherein the analysis metrics include snapshot metrics that represent respective properties of the commit history of snapshots in the software development project, functionality metrics that represent respective properties of software elements in the software development project, or both. A similarity grouping is computed for the primary software development project based on the respective computed values for the plurality of analysis metrics for the plurality of software development projects, wherein the similarity grouping for the primary software development project comprises fewer than all of the plurality of software development projects.

18 Claims, 5 Drawing Sheets

(56) References Cited

U.S. PATENT DOCUMENTS

| | | | |
|---|---|---|---|
| 8,463,792 B2 | 6/2013 | Mayo | |
| 8,527,940 B2* | 9/2013 | Andersen | G06F 8/71 717/105 |
| 8,676,853 B2* | 3/2014 | Kasravi | G06F 8/36 707/792 |
| 8,769,501 B2 | 7/2014 | Salecker et al. | |
| 8,832,655 B2* | 9/2014 | Grechanik | G06F 11/3419 717/123 |
| 9,003,366 B2* | 4/2015 | Zeidman | G06F 21/105 717/123 |
| 9,256,422 B2* | 2/2016 | Grechanik | G06F 8/70 |
| 9,778,914 B2* | 10/2017 | Danielson | G06F 8/65 |
| 9,804,838 B2* | 10/2017 | Grechanik | G06F 16/951 |
| 10,055,222 B2* | 8/2018 | Srivastava | G06F 16/24578 |
| 10,114,624 B1* | 10/2018 | Makkar | G06F 8/36 |
| 10,241,786 B2* | 3/2019 | Bhamidipaty | G06F 8/77 |
| 10,255,065 B1* | 4/2019 | Jensen | G06F 8/75 |
| 10,275,240 B2* | 4/2019 | Kogan | G06F 8/77 |
| 10,339,311 B2* | 7/2019 | Haerterich | G06F 21/562 |
| 10,657,023 B1* | 5/2020 | Willson | G06F 8/77 |
| 10,671,510 B1* | 6/2020 | Willson | G06F 11/3604 |
| 2004/0172612 A1* | 9/2004 | Kasravi | G06F 8/36 717/101 |
| 2007/0294610 A1* | 12/2007 | Ching | G06F 16/94 |
| 2010/0211924 A1* | 8/2010 | Begel | G06F 16/9024 717/101 |
| 2010/0325614 A1* | 12/2010 | Zeidman | G06F 21/105 717/123 |
| 2011/0184938 A1* | 7/2011 | Hill | G06F 8/71 707/722 |
| 2011/0209114 A1* | 8/2011 | Andersen | G06F 8/71 717/101 |
| 2013/0086553 A1* | 4/2013 | Grechanik | G06F 8/70 717/123 |
| 2013/0326469 A1* | 12/2013 | Fox | G06F 8/71 717/101 |
| 2014/0344783 A1* | 11/2014 | Grechanik | G06F 8/70 717/123 |
| 2015/0020048 A1* | 1/2015 | Misra | G06F 8/73 717/120 |
| 2016/0088120 A1 | 3/2016 | Bala et al. | |
| 2016/0110186 A1* | 4/2016 | Grechanik | G06F 11/3419 717/123 |
| 2016/0202967 A1* | 7/2016 | Misra | G06F 8/315 717/120 |
| 2016/0283229 A1* | 9/2016 | Rogers | G06F 8/751 |
| 2016/0378445 A1* | 12/2016 | Kashiwagi | G06F 8/77 717/143 |
| 2017/0192778 A1* | 7/2017 | Srivastava | G06F 8/20 |
| 2017/0300691 A1* | 10/2017 | Upchurch | G06F 16/358 |
| 2018/0136933 A1* | 5/2018 | Kogan | G06F 16/26 |
| 2018/0210728 A1* | 7/2018 | Bhamidipaty | G06Q 10/063 |
| 2018/0239898 A1* | 8/2018 | Haerterich | G06F 8/71 |
| 2018/0276103 A1* | 9/2018 | Woulfe | G06F 11/362 |
| 2018/0293160 A1 | 10/2018 | van Schaik | |
| 2018/0314953 A1* | 11/2018 | Benedict | G06N 20/00 |
| 2018/0336018 A1* | 11/2018 | Lu | G06F 8/70 |
| 2019/0066029 A1 | 2/2019 | Hancock et al. | |
| 2019/0108016 A1* | 4/2019 | Antons | G06F 11/3476 |

OTHER PUBLICATIONS

Yamauchi, Kenji, et al. "Clustering commits for understanding the intents of implementation." 2014 IEEE International Conference on Software Maintenance and Evolution. IEEE, 2014. (Year: 2014).*

Hammad, Mustafa. "Identifying related commits from software repositories." International Journal of Computer Applications in Technology 51.3 (2015): 212-218. (Year: 2015).*

Mockus, Audris. "Amassing and indexing a large sample of version control systems: Towards the census of public source code history." 2009 6th IEEE International Working Conference on Mining Software Repositories. IEEE, 2009. (Year: 2009).*

* cited by examiner

DETERMINING SIMILARITY GROUPINGS FOR SOFTWARE DEVELOPMENT PROJECTS

CROSS-REFERENCE TO RELATED APPLICATION

This application claims benefit of priority to U.S. Application No. 62/611,743, filed on Dec. 29, 2017, the entire contents of which are hereby incorporated by reference.

BACKGROUND

This specification relates to static analysis of computer software.

Static analysis refers to techniques for analyzing computer software source without executing the source code associated with the computer software. Static analysis may rely on one or more characteristic metrics associated with software development projects. Using characteristics metrics, static analysis systems attempt to determine accurate and reliable conclusions about various properties of software development projects. Such conclusions may be used for a variety of purposes, including software performance optimization, software debugging, and software development cost estimation.

Static analysis can be performed on a code base, which is a collection of source code files that is typically maintained by a version control system. Version control systems generally maintain multiple revisions of the source code in the code base, each revision being referred to as a snapshot. Each snapshot includes the source code of files of the code base as the files existed at a particular point in time. Snapshots stored in a version control system can be represented as a directed, acyclical revision graph. Each node in the revision graph represents a commit of the source code. Generally, a particular developer is responsible for each commit in a revision graph. A commit represents a snapshot as well as other pertinent information about the snapshot such as the author of the snapshot, and data about ancestor commits of the node in the revision graph.

Results from static analysis systems can be used to (visually) compare any number of different (possibly heterogeneous) projects. As the number of projects grows, the visualization becomes more and more incomprehensible. This severely reduces the usability for end users.

SUMMARY

This specification describes how a system can compute a similarity grouping for software development projects. The similarity grouping for a software development project includes a plurality of other software development projects that are considered to be most similar to the primary software development project according to a plurality of analysis metrics.

Particular embodiments of the subject matter described in this specification can be implemented so as to realize one or more of the following advantages. An end user of a static analysis system can obtain a similarity grouping for a primary software development project. By limiting project comparisons to projects that are most similar to the primary project, a system can present comparisons between projects that are easier to comprehend for end users. Additionally, projects that are considered similar to a primary project can be suggested to the end user for further investigation. Such projects are likely interesting to the end user who has expressed interest in the primary project. Lastly, this technique can be used to reduce the amount of data that needs to be processed and transmitted to the end user.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A static analysis system can determine similarities between software development projects and use those similarities to present an end user of the system with similar software development projects. In this specification, the term "software development project," or for brevity, a "project," is a code base having a collection of source code files. A project generally organizes the collection of source code files in a particular way, e.g., in a hierarchical directory structure, with each source code file in the project having a respective path. Typically, the source code files in a project provide one or more of related functionalities.

In the systems described below, the systems can derive analysis metrics of software development projects from source code of the projects and metadata information associated with the projects. The systems can then compare the computed values for the analysis metrics to determine measures of similarity between projects. Each project may be characterized by a group of similar projects, and comparative analysis of that project may be limited to comparing the respective project with the projects in that similarity grouping.

A static analysis system can use information about similarities between software development projects to present evaluations of projects and their similarity groupings. Such evaluations may include n-dimensional analyses of one or more properties of software development projects, including the similarity scores of such projects relative to a primary software development project. The evaluations can provide contextual comparisons of software development projects with similar projects. The system can then present the results of such evaluations to an end user in one or more user interface presentations.

A static analysis system can use the techniques described below to determine similarities between software development projects and present comparative analyses of such similarities. For example, the system can determine a plurality of software development projects most similar to a primary software development project and present a ranking of the plurality of projects based on similarity to the primary project.

Figure 1:
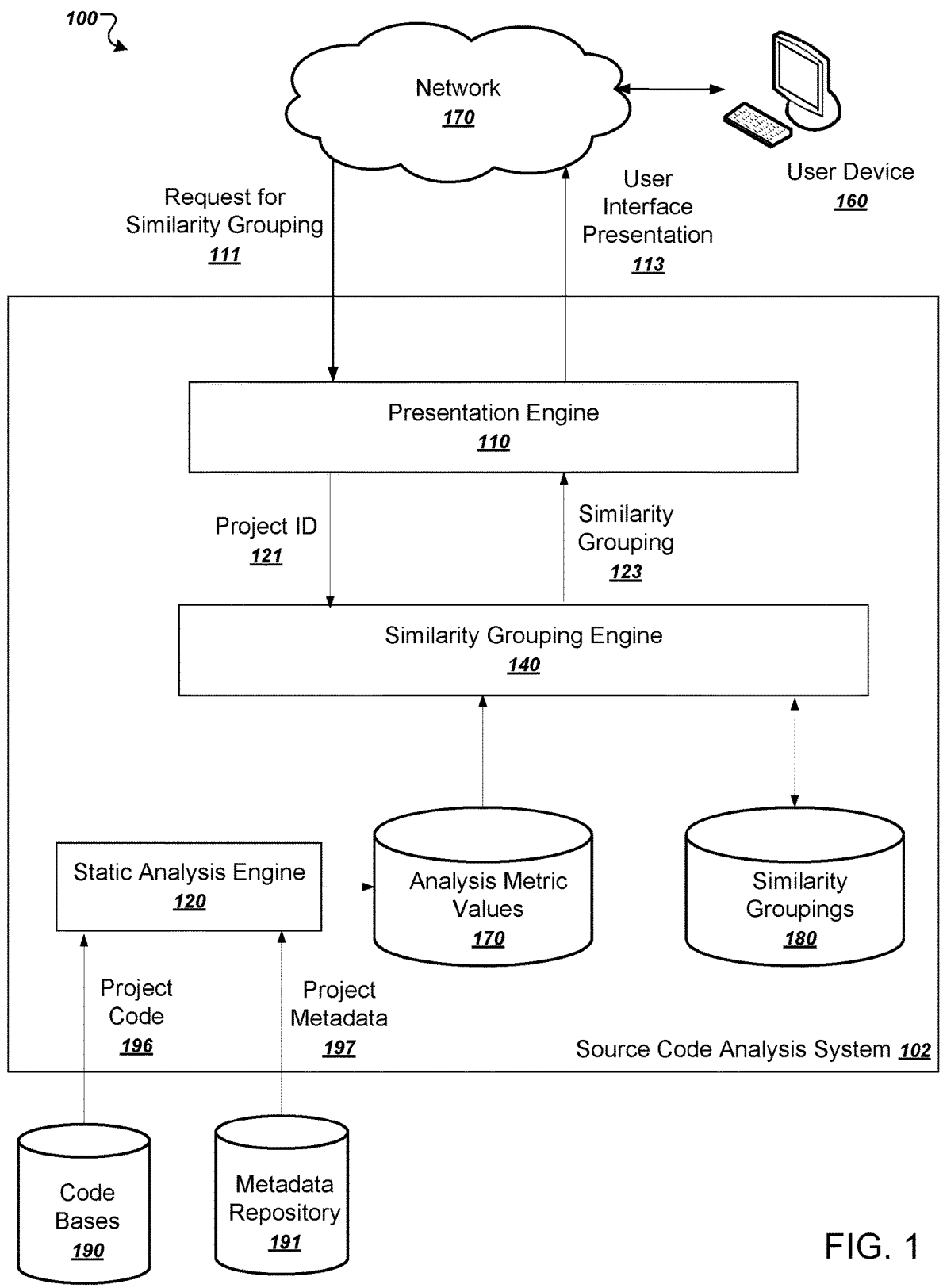
FIG. 1 is a diagram that illustrates an example system.

FIG. 1 is a diagram that illustrates an example system 100. The system 100 includes a user device 160 in communication with a source code analysis system 102 over a network 170. The static analysis system 102 is an example of a static analysis system that can be implemented locally or in a distributed, cloud-based environment for performing analysis for a single project or for multiple projects.

The source code analysis system 102 includes several components, including a static analysis engine 120, a similarity grouping engine 140, and a presentation engine 110. The components of the source code analysis system 102 can be implemented as computer programs installed on one or more computers in one or more locations that are coupled to each through a network. In a cloud-based static analysis system, these components can be implemented by individual computing nodes of a distributed computing system.

A user of user device 160 provide a request for a similarity grouping 111 to the source code analysis system 102 in order to obtain a similarity grouping for a particular software development project. Information about the software development projects is stored in the code bases 190, which includes the source code files associated with the projects, and the metadata repository 191, which includes metadata information about the projects. Examples of metadata information about a software development project include information about the developers of the project and information about revision history of the project. The code base 190 and the metadata repository 191 can be stored as part of the source code analysis system 102 or in an external storage system.

The static analysis engine 120 can receive project code 196 from the code base 190 and project metadata 197 from the metadata repository 191. The static analysis engine 120 can analyze the project code 196 and project metadata 197 inputs to compute analysis metric values 170 associated with a project. The values of some analysis metrics 170 may be available in a precomputed form in the metadata repository 191. The static analysis engine 120 can retrieve the values of these analysis metrics 170 as project metadata 197 without the need for further processing.

Analysis metric values 170 are properties of software development projects. Examples of project properties that can be used as analysis metric values 170 include the identity of developers of projects, the size of projects, the revision history of projects, the names of programming language constructs used in projects, and the functional dependencies of projects, to name just a few examples. Computing analysis metric values is described in more detail below with reference to FIG. 2.

The similarity grouping engine 140 can use the analysis metric values 170 to determine similarity groupings 180 between a primary software development project and one or more other software development projects. The system can compute the analysis metric values 170 for a project every time a similarity grouping for the project is requested. The system can alternatively precompute the similarity groupings 180 for each of one or more projects and then save them for future use within a particular period of time.

The presentation engine 130 can generate user interface presentations 113 based on the similarity grouping 123 for a primary software development project. For example, the presentation engine 130 can display a ranking table, where the ranking table ranks projects in a similarity grouping for a primary software development project based on the size of those projects. As such, the presentation engine 130 can generate the noted ranking table based on the similarity score and size of each project.

The presentation engine 110 uses the similarity grouping 123 to generate a user interface presentation 113. The user interface presentation 113 can include a comparison of a plurality of software development projects based on determinations about the similarity grouping 123 of one of the projects (i.e. the primary software project). For example, the presentation engine 110 generates a user interface presentation 113, where the user interface presentation 113 includes a clustering graphical representation. A clustering graphical representation can represent a cluster of software development projects including the primary software development project and members of the similarity grouping of the primary project whose size is less than the primary project. As such, the presentation engine 110 generates the clustering graphical representation based on respective similarity scores and sizes of software development projects.

Figure 2:
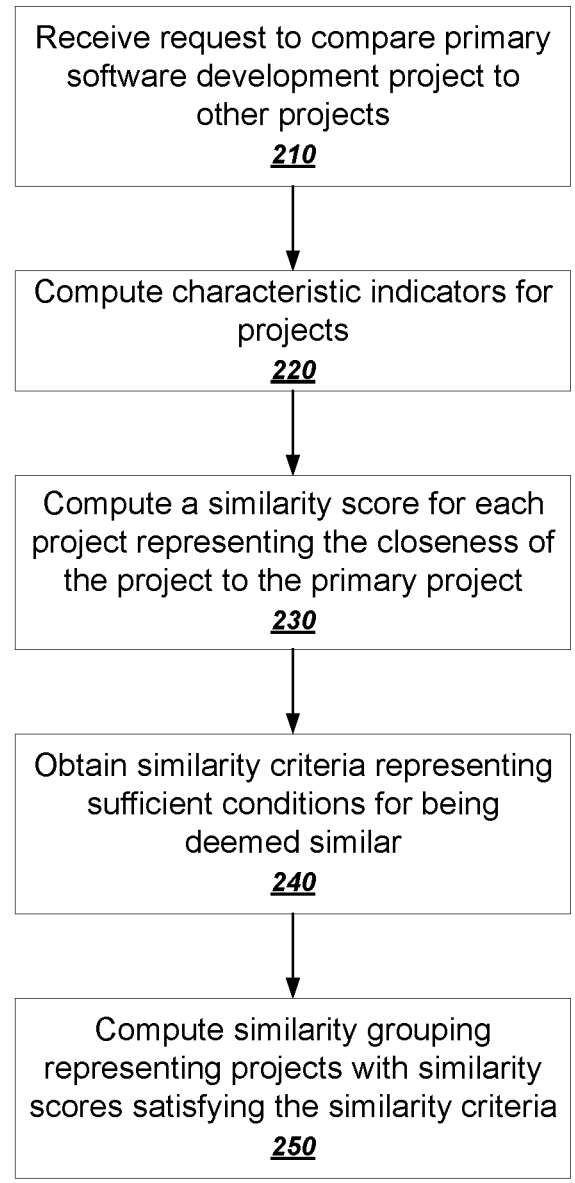
FIG. 2 is a flow chart of an example process for determining similar software development projects.

FIG. 2 is a flow chart of an example process for computing a similarity grouping for a particular software development project. The system can use the example process to compute a similarity grouping for a primary software development project that is subset of a plurality of software development projects. The process can be implemented by one or more computer programs installed on one or more computers. The process will be described as being performed by a system of one or more computers, e.g., the source code analysis system 102 of FIG. 1.

The system receives a request for a similarity grouping for a primary software development project (210). The similarity grouping for the primary software development project includes one or more software development projects among a plurality of software development projects. In other words, the similarity grouping includes other software development projects that the system considers to be most similar to the primary software development project.

The request can come from an end user of the system or from one or more computer applications that request the services of the system. In some implementations, the request comes from a computer application that uses similarity groupings to provide such information for end users of the system. In some implementations, the request comes from a computer application that uses similarity groupings to rank the primary software development project among a plurality of similar software development projects in the similarity grouping.

Typically, the system precomputes a similarity grouping for each of one or more software development projects before the request is received. Then, for a particular primary software development project, the system can obtain the precomputed similarity grouping. Alternatively, the system can compute the similarity grouping after the request for the similarity grouping is received.

The system computes respective values for a plurality of analysis metrics associated with each software development project in the plurality of software development projects (220). Analysis metrics can include any appropriate metrics that can be computed by a static analysis system that analyzes a plurality of software development projects. Analysis metrics typically include snapshot metrics that represent respective properties of the commit history of snapshots in a software development project, functionality metrics that represent properties of software elements in the software development project, or both. Analysis metrics can be computed for individual projects, e.g., a project age, or between pairs of projects, e.g., a number overlapping developers between the projects.

Snapshot metrics represent properties computed from the revision graph of a software development project. Snapshot metrics can include a measure of overlapping developers between two or more software development projects, an the age of a software development project, and a measure of project activeness of a software development project, to name just a few examples.

A first example snapshot metric is a measure of overlapping developers. The system can compute a measure of overlapping developers between software development projects by computing how many developers in total are common to both projects, or how many developers who have committed at least a threshold amount of code to the projects are common to both projects. For example, the threshold amount of code can be measured in terms of lines of code added, churn, or commits. Having more overlapping developers will result in projects being more likely to be in the same similarity grouping than having fewer overlapping developers. The measure of how many developers are common to both projects can be expressed either as a raw number of developers, a normalized number of developers, or a proportion, e.g., as a percentage of overall or active developers of the project.

A second example snapshot metric is an age between the software development projects. In general, the age of a software development project is a measure of how much time has elapsed since a portion of the software development project was created. Projects having more similar ages makes it more likely that the projects will be in the same similarity grouping. In other words, as the difference in ages grows larger, the likelihood of the projects being included in the same similarity grouping grows smaller.

A third example snapshot metric is a measure of project activeness. The system can compute a measure of project activeness by computing a representative frequency of revisions to the project over one or more periods of time. For example, two projects that are very active are more likely to be in the same similarity grouping than two projects in which one is very active and the other is not. In some implementations, the system determines the measure of project activeness of a software development project by calculating a weighted count of revisions to the project within a period of time, where the more recent revisions to the project are given more weight than less recent revisions.

A fourth example snapshot metric is a measure of project size. Projects having similar sizes are more likely to be in the same similarity grouping than two projects having very different sizes. The measure of project size can be represented as a count of characters, lines of code, or files in the project, to name just a few examples.

The system can also use any other appropriate snapshot metrics that are computed from the revision history of the project.

Functionality metrics represent properties of software elements in the software development project. Functionality metrics can include a measure of shared functional dependencies between software development projects, and a measure of overlapping programming construct identifiers, to name just a few examples.

A first example functionality metric is a measure of overlapping functional dependencies between software development projects. Projects having many overlapping functional dependencies will be more likely to be in the same similarity grouping than projects having few overlapping functional dependencies. Functional dependencies of a software development project can include any combination of software components that the software development project depends on, e.g., external source code files, libraries, object files, class files, and packages, to name just a few examples.

A second example functionality metric is a measure of overlapping programming construct identifiers. Programming construct identifiers can include function names, variable names, object names, structure names, array names, class names, and package names, used by a software development project. Projects having many overlapping programming construct identifiers will be more likely to be in the same similarity grouping than projects having few overlapping programming construct identifiers.

The system can compute the measure of overlapping programming construct identifiers by comparing the frequency that each identifier is used within a project. The system can generate a vector in which each element represents a distinct identifier, and the value associated with the element represents the frequency that the identifier is used in the project. The system can then compute a measure of vector similarity between two projects to compute the measure of overlapping programming construct identifiers.

In addition to the analysis metrics, the system can also use other metrics to compute a similarity grouping. For example, the system can use user-assigned scores between projects. On some coding platforms, users can rate projects by assigning a score. Examples include GitHub and Bitbucket. Projects having very similar user scores are more likely to be included in the similarity grouping than projects having very different user scores. The system can also use any other appropriate properties of the software development projects to determine the measure of similarity between the projects.

The system computes a similarity grouping for the primary software development project based on the respective computed values for the plurality of analysis metrics for the plurality of software development projects (230). In general, the system uses the computed values for the plurality of analysis metrics to determine a proper subset of the projects that are most similar to the primary software development project. In other words, the similarity grouping for the primary software development project is a subset of the plurality of software development projects that includes fewer than all of the plurality of software development projects.

To compute the similarity grouping, the system can use a scoring function that maps the values of the analysis metrics to a similarity score, or equivalently, a distance. For each analysis metric used between two projects, the system can compare the respective values computed for the analysis metric. For individual analysis metrics computed from a single project, e.g., a project age, the system can compute a difference between respective values for the analysis metrics, e.g., a difference in project age. For analysis metrics that are computed from multiple projects, e.g., a number of overlapping developers, the system can simply use the value of the analysis metric when computing the similarity score.

The system can use any appropriate technique to compute a similarity score from the computed values of the analysis metrics. For example, the system can compute a raw sum or a weighted sum from the values of the analysis metrics. The system can also compute a measure of vector similarity by generating a vector for each project in which each element represents a different analysis metric and each value represents a computed value for the corresponding analysis metric.

The system can then use the computed similarity score to compute the similarity grouping. For example, the system can use the similarity score to perform a clustering process that classifies each software development project into one of a plurality of clusters. Then, the system can designate other projects that are in the same cluster as the primary software development project as the similarity grouping for the primary software development project.

As another example, the system can impose a threshold on the similarity score. Then, the system can designate all other projects that have similarity scores that satisfy the similarity threshold as being in the similarity grouping for the primary software development project.

As another example, the system can compute the similarity grouping as the N most-similar projects to the primary software development project. In general, the system can compute a value for N so that it represents a sufficiently small proportion of the plurality of software development projects, e.g., no more than 5%, 10%, or 50% of the plurality of software development projects.

The system provides data representing the similarity grouping for the primary software development project in response to the request (240). The system can provide the data representing the similarity grouping in a number of ways. For example, the system can simply provide a list of projects in the similarity grouping. The system can also rank the projects in the similarity grouping according to any of a number of metrics computed for each project, e.g., size or a measure of quality. The system can also generate any of a number of different user interface presentations, which are described in more detail below with reference to FIGS. 4-5.

Figure 3:
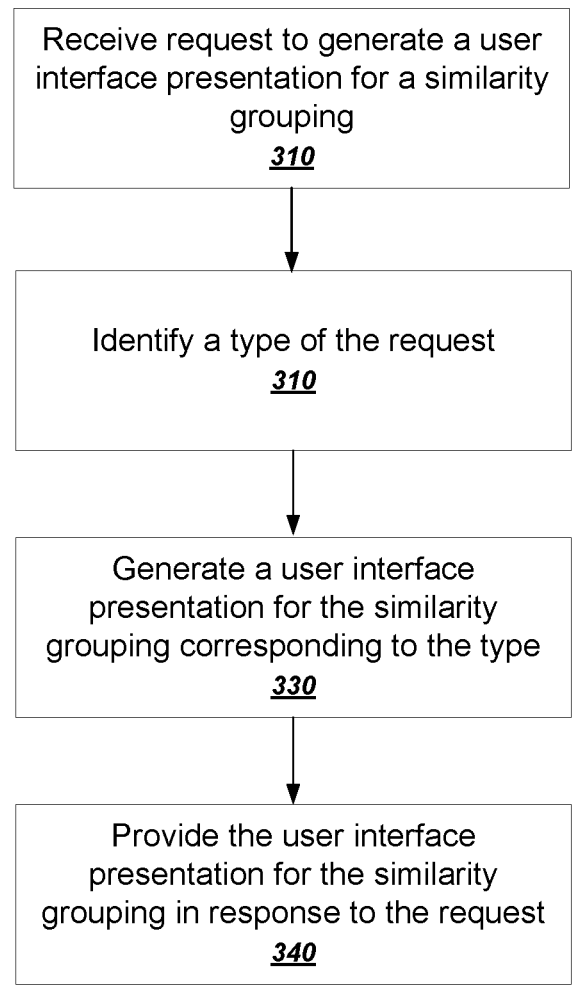
FIG. 3 is a flow chart of an example process for presenting project similarity information.

FIG. 3 is a flow chart of an example process for generating a user interface presentation for a similarity grouping. The process can be implemented by one or more computer programs installed on one or more computers. The process will be described as being performed by a system of one or more computers, e.g., the presentation engine 110 of FIG. 1.

The system receives a request to generate a user interface presentation for a similarity grouping for a primary software development project (310). The request to generate the user interface presentation can be part of the request for a similarity grouping as described above with reference to FIG. 2. While the system can precompute the similarity grouping, the system can generate the user interface presentation for the similarity grouping after the request for the user interface presentation is received.

The system identifies a type of the request (320). The request for the can be characterized by a type. Examples of request types include requests for a scatter plot diagram comparing multiple properties of a plurality of software development projects, requests for a ranking of a plurality of software development projects in the similarity grouping, and requests for identifying one or more software development projects in the similarity grouping, to name just a few examples.

In some implementations, the request to generate a user interface presentation is a request to generate a graphical representation of a multi-dimensional comparison of each software development project in the similarity grouping. Each of the multiple dimensions can represent values of any of a number of different project properties, which can be any of the metrics used to compute the similarity grouping or other properties, e.g., size and a measure of quality.

Thus, the graphical representation includes (i) a plurality of axes, each axis of the plurality of axes representing the respective values for a respective property or metric, and (ii) a plurality of points corresponding to software development projects. In some implementations, the visual representation is a two-dimensional scatter plot diagram.

Figure 4:
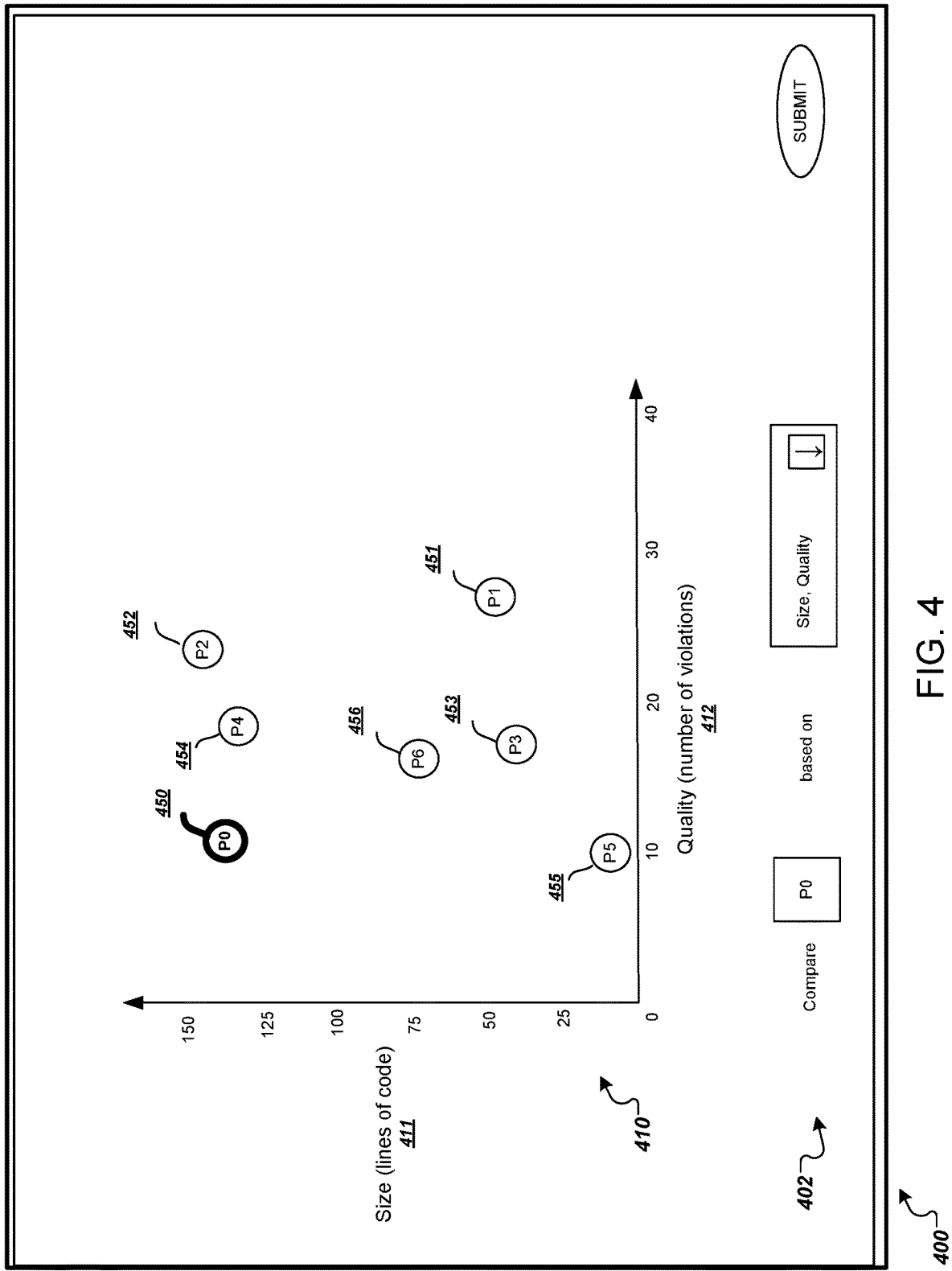
FIG. 4 illustrates an example scatter plot user interface presentation.

FIG. 4 illustrates an example scatter plot user interface presentation 400. The presentation 400 is an example of a multi-dimensional comparison for projects in a similarity grouping. The presentation 400 can be provided as output generated by a platform that provides end user access to the static analysis system, such as a web platform provided through a website.

The presentation 400 includes a set of control widgets 402 that enable an end user of the platform to input a primary software development project and the properties of the software development projects in the similarity grouping that the end user wishes to compare. The end user can enter the primary software development projects in the text box marked with the word "Compare," and the comparison properties in the drop-down menu marked with the phrase "based on". The button marked with the word "SUBMIT" enables the end user to send its inputs entered in the text boxes to the platform. After receiving the input, the platform can generate or obtain a similarity grouping for the primary software development projects and display other software development projects in the similarity grouping in the scatter plot based on the specified comparison properties.

In the example of FIG. 4, the end user has marked P0 as the primary software development project. The end user has also selected, as the desired comparison properties, a size of the projects and a measure of quality of projects. It is assumed that the end user has previously clicked on the submit button to communicate to the platform its selection of the primary software development project and the desired comparison properties.

The presentation 400 includes a scatter plot diagram 410 with a y-axis 411 denoting the size of the software development projects, expressed in terms of lines of code, and an x-axis 412 denoting quality of software development projects. In this example, the quality of software development projects is expressed in a total number of coding defects in the project, which are referred to as violations. Information describing violations identified in a project can be referred to as alerts for the project. Coding defects can be identified as source code segments that violate one or more coding standards in a collection of coding standards. The types of coding defects that a static analysis system can identify include correctness standards on coding concurrent processes, maintainability standards on eliminating duplicate code segments, readability standards on reducing code complexity, and framework standards on using code libraries, to name just a few examples.

The scatter plot diagram includes circles 450-456 whose center points correspond to the size and quality of software development projects P0-P6 respectively. The circle 450 corresponding to P0 is bolded to indicate that P0 has been selected as the primary software development project.

In some other implementations, the request for a similarity grouping is a request to rank the primary software development project relative to software development projects in the similarity grouping. The system can rank projects in the similarity grouping by any of a number of different properties, which can include any of the metrics used to compute the similarity score as well as the similarity score itself or any other appropriate property, e.g., a size or a measure of quality of the project.

Figure 5:
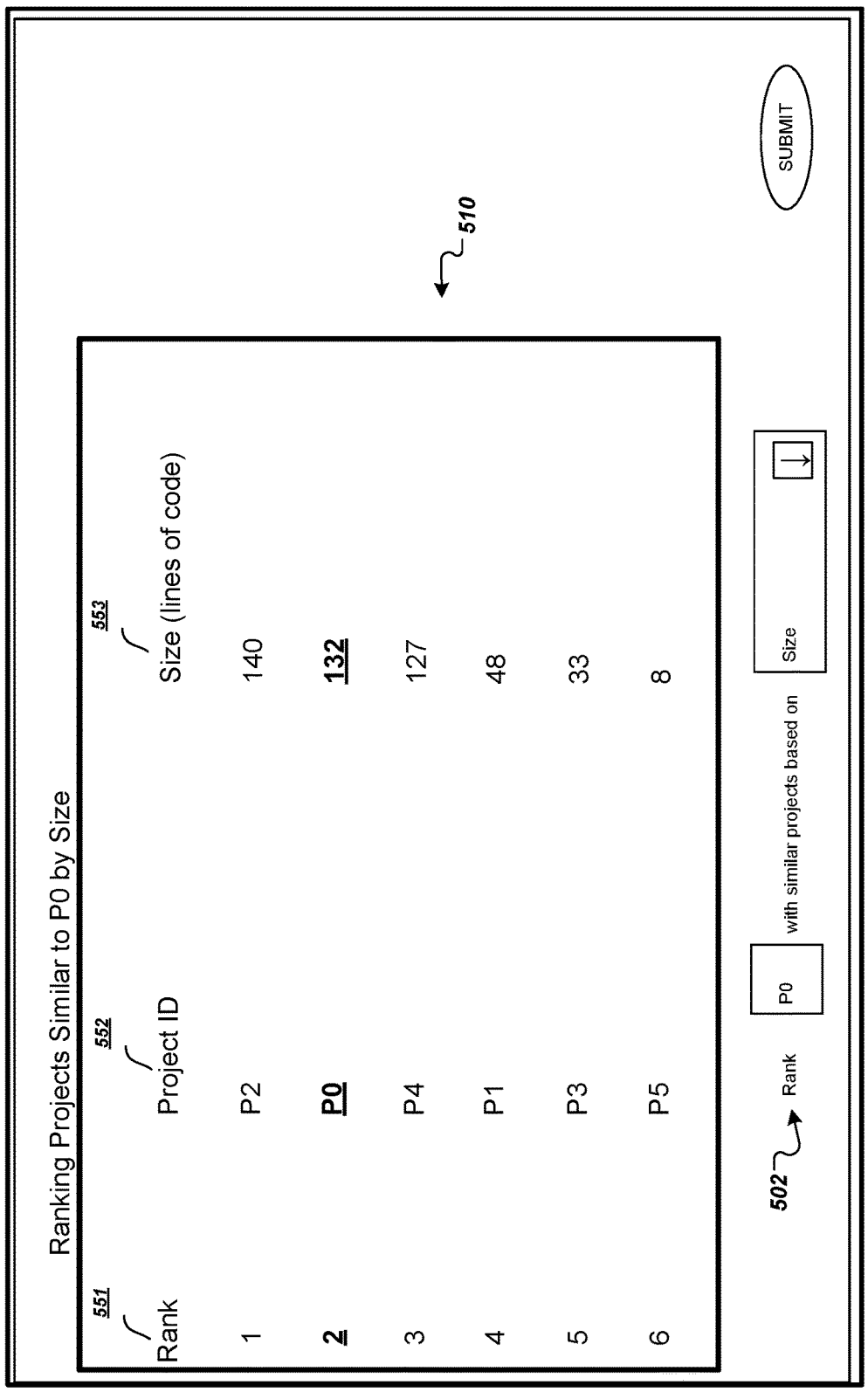
FIG. 5 illustrates an example ranking table user interface presentation.

FIG. 5 illustrates an example ranking table user interface presentation 500. The presentation 500 is an example ranking presentation for projects in a similarity grouping. The presentation 500 can be provided as part of a platform that provides end user access to the static analysis system, such as a web platform provided through a website.

The presentation 500 includes a set of control widgets 502 that enable an end user of the platform to input the primary software development project and a property of the software development project that the user intends to use as the basis of the ranking. The end user can enter the primary software development projects in the text box marked with the word "Rank" and the ranking property in the drop-down menu marked with the phrase "based on". The button marked with the word "SUBMIT" enables the end user to send its inputs entered in the text boxes to the platform. After receiving the input, the platform displays a ranking of the primary software development project and other projects in the similarity grouping of the primary project based on the selected ranking property.

In the example of FIG. 4, the end user has marked P0 as the primary software development project and selected size of the projects as the desired ranking property. It is assumed that the end user has previously clicked on the submit button to communicate to the platform its selection of the primary software development project and the desired ranking property.

The presentation 500 includes a three-column ranking table 510 which shows a ranking of software development projects P0-P5 in the similarity grouping for P0 based on the size of the projects. The first column 551 of the table 551 shows the rank of a project. The second column 552 shows the identifier of the respective project. The third column 553 shows a measure of the size of the respective project based on the lines of code in the files associated with the project. In the example of FIG. 5, the ranking table 510 only includes projects that are in the similarity grouping associated with P0, and as such excludes projects P6 and P7 which are not in the similarity grouping. The table row corresponding to project P0 is bolded to denote the special status of P0 as the primary software development project.

FIGS. 4 and 5 illustrated examples in which the system generates a full-page presentation of information about a similarity grouping for a project. The system can alternatively or in addition incorporate information about the similarity grouping in other user interface presentations.

As one example, the system can incorporate similarity grouping information into a user interface presentation for alerts in a project. When the system generates a user interface presentation that includes a number of alerts for the project, the system can also include information generated from the similarity grouping for the project. For example, the presentation can compare the alerts in the project to other projects in the similarity grouping, e.g., "Your project has 15 alerts of type B. This is 10% more than other similar projects, but still 5% less than the average project."

As another example, the system can generate suggestions for users to browse other projects in the similarity grouping. For example, when a user is browsing a project page of Project X, the system can include a suggestion to also browse a Project Y that is in the similarity grouping for Project X.

As a third example, the system can generate suggestions for which projects users should work on. For example, if a user contributes to Project X, the system can generate a suggestion for the user to also contribute to a Project Y that is in the similarity grouping for Project X. In some implementations, the system can determine a violation type that is frequently fixed by a user and then identify other projects in the similarity grouping that have a substantial number of violations of that type. For example, the system can identify a type of violations most often fixed by a user and then rank projects in the similarity grouping by how many violations of that type occur in the project. The system can then suggest the highest-ranking project as a project for which the user could make particularly helpful contributions. Suitable techniques for attributing violations of various types are described in commonly owned U.S. Pat. No. 9,262,157, for "Source Code Violation Matching and Attribution," which is incorporated here by reference.

As shown in FIG. 3, the system generates a user interface presentation corresponding to the identified request type (330) and provides the user interface presentation for the similarity grouping in response to the request (340). For example, the user interface presentation can be provided as a web page to the user device of an end user of a static analysis system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a request for a similarity grouping for a primary software development project, wherein the similarity grouping includes one or more software development projects among a plurality of software development projects;

computing respective values for a plurality of analysis metrics associated with each software development project in the plurality of software development projects, wherein the analysis metrics include snapshot metrics that represent respective properties of the commit history of snapshots in the software development project, functionality metrics that represent respective properties of software elements in the software development project, or both;

computing a similarity grouping for the primary software development project based on the respective computed values for the plurality of analysis metrics for the plurality of software development projects, wherein the similarity grouping for the primary software development project comprises fewer than all of the plurality of software development projects; and providing data representing the similarity grouping for the primary software development project in response to the request.

Embodiment 2 is the method of embodiment 1, wherein computing the similarity grouping comprises performing a clustering process using respective values for the snapshots metrics that represent properties of the commit history of snapshots in the software development project, functionality metrics that represent properties of software elements in the software development project, or both, wherein the clustering process assigns the primary software development project to a particular cluster having one or more other software development projects of the plurality of software development projects; and designating the one or more other software development projects that are assigned to the particular cluster as belonging to the similarity grouping for the primary software development project.

Embodiment 3 is the method of any one of embodiments 1-2, wherein computing the similarity grouping comprises:

computing a respective similarity score between the primary software development project and each software development project in the plurality of other software development projects using respective values for the snapshot metrics that represent properties of the commit history of snapshots in the software development project, functionality metrics that represent properties of software elements in the software development project, or both;

determining which of the plurality of software development projects are the N most-similar projects according to the respective similarity scores; and designating the N most-similar projects as belonging to the similarity grouping for the primary software development project.

Embodiment 4 is the method of any one of embodiments 1-3, further comprising computing a value of N to be no more than a particular proportion of the plurality of software development projects.

Embodiment 5 is the method of any one of embodiments 1-4, wherein computing the similarity grouping comprises:

computing a respective similarity score between the primary software development project and each software development project in the plurality of other software development projects using respective values for the snapshot metrics that represent properties of the commit history of snapshots in the software development project, the functionality metrics that properties of software elements in the software development project, or both; and designating one or more of the plurality of software development projects having similarity scores that satisfy a threshold as belonging to the similarity grouping for the primary software development project.

Embodiment 6 is the method of any one of embodiments 1-5, wherein the snapshot metrics include a measure of overlapping developers between software development projects and further comprising:

computing a respective measure of overlapping developers between the primary software development project and each other project in the plurality of software development projects.

Embodiment 7 is the method of any one of embodiments 1-6, wherein the snapshot metrics include a respective age of each project, and further comprising:

computing a difference between an age of the primary software development project and each other project in the plurality of software development projects.

Embodiment 8 is the method of any one of embodiments 1-7, wherein the snapshot metrics include a measure of project activeness, wherein the measure of project activities represents a frequency of revisions of a project over one or more periods of time, and further comprising:

computing a difference between a measure of project activeness for the primary software development project and each other project in the plurality of software development projects.

Embodiment 9 is the method of any one of embodiments 1-8, wherein the snapshots metrics include a measure of project size, and further comprising:

computing a difference between a measure of project size for the primary software development project and each other project in the plurality of software development projects.

Embodiment 10 is the method of any one of embodiments 1-9, wherein the functionality metrics include a measure of overlapping functional dependencies between software development projects, and further comprising:

computing a respective measure of overlapping functional dependencies between the primary software development project and each other project in the plurality of software development projects.

Embodiment 11 is the method of any one of embodiments 1-10, wherein the functionality metrics include a measure of overlapping programming construct identifiers, and further comprising:

computing a respective measure of overlapping programming construct identifiers between the primary software development project and each other project in the plurality of software development projects Embodiment 12 is the method of embodiment 11, wherein the request for the similarity grouping is a request to rank the primary software development project relative to one or more other projects in the similarity grouping, and further comprising:

computing a respective similarity score between the primary software development project and each other project in the similarity grouping;

ranking software development projects in the similarity grouping according to the computed similarity scores; and providing data identifying one or more highest-ranked projects in response to the request.

Embodiment 13 is the method of any one of embodiments 1-12, further comprising: generating a presentation that displays projects in the similarity grouping according to at least two other metrics.

Embodiment 14 is the method of embodiment 13, wherein the two other metrics include a size and a measure of quality of each software development project.

Embodiment 15 is the method of embodiment 14, further comprising displaying a presentation that ranks software development projects in the similarity grouping.

Embodiment 16 is the method of embodiment 15, wherein the presentation ranks the software development projects in the similarity grouping by size or by a measure of quality.

Embodiment 17 is the method of any one of embodiments 1-16, further comprising:

receiving an indication that a user is browsing the primary software development project; and in response, generating a user interface presentation that includes a suggestion for the user to work on or browse one or more other projects in the similarity grouping for the primary software development project.

Embodiment 18 is the method of embodiment 17, further comprising:

determining a violation type most often fixed by the user;

ranking projects in the similarity grouping according to a frequency that violations having the violation type occur in the project; and generating a suggestion that the user work on a highest-ranking project in the similarity grouping.

Embodiment 19 is the method of any one of embodiments 1-18, further comprising: receiving an indication that a user has requested a particular property of the primary software development project; and in response, generating a user interface presentation that presents information comparing the particular property of the primary software development project to one or more other projects in the similarity grouping for the primary software development project.

Embodiment 20 is a system comprising: one or more computers and one or more storage devices storing instructions that are operable, when executed by the one or more computers, to cause the one or more computers to perform the method of any one of embodiments 1 to 19.

Embodiment 21 is a computer storage medium encoded with a computer program, the program comprising instructions that are operable, when executed by data processing apparatus, to cause the data processing apparatus to perform the method of any one of embodiments 1 to 19.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising: receiving a request for a similarity grouping for a primary software development project, wherein the similarity grouping includes one or more software development projects among a plurality of software development projects; computing respective values for a plurality of analysis metrics associated with each software development project in the plurality of software development projects, wherein the analysis metrics include snapshot metrics that represent respective properties of the commit history of snapshots in the software development project, functionality metrics that represent respective properties of software elements in the software development project, or both; computing a similarity grouping for the primary software development project based on the respective computed values for the plurality of analysis metrics for the plurality of software development projects, wherein the similarity grouping for the primary software development project comprises fewer than all of the plurality of software development projects; determining a violation type most often fixed by the user within the similarity grouping; ranking projects in the similarity grouping according to a frequency that violations having the violation type occur in the project; and providing data representing the similarity grouping for the primary software development project in response to the request according to the ranking.

2. The method of claim 1, wherein computing the similarity grouping comprises: performing a clustering process using respective values for the snapshots metrics that represent properties of the commit history of snapshots in the software development project, functionality metrics that represent properties of software elements in the software development project, or both, wherein the clustering process assigns the primary software development project to a particular cluster having one or more other software development projects of the plurality of software development projects; and designating the one or more other software development projects that are assigned to the particular cluster as belonging to the similarity grouping for the primary software development project.

3. The method of claim 1, wherein computing the similarity grouping comprises: computing a respective similarity score between the primary software development project and each software development project in the plurality of other software development projects using respective values for the snapshot metrics that represent properties of the commit history of snapshots in the software development project, functionality metrics that represent properties of software elements in the software development project, or both; determining which of the plurality of software development projects are the N most-similar projects according to the respective similarity scores; and designating the N most-similar projects as belonging to the similarity grouping for the primary software development project.

4. The method of claim 1, further comprising computing a value of N to be no more than a particular proportion of the plurality of software development projects.

5. The method of claim 1, wherein computing the similarity grouping comprises: computing a respective similarity score between the primary software development project and each software development project in the plurality of other software development projects using respective values for the snapshot metrics that represent properties of the commit history of snapshots in the software development project, the functionality metrics that properties of software elements in the software development project, or both; and; designating one or more of the plurality of software development projects having similarity scores that satisfy a threshold as belonging to the similarity grouping for the primary software development project.

6. The method of claim 1, wherein the snapshot metrics include a measure of overlapping developers between software development projects and further comprising: computing a respective measure of overlapping developers between the primary software development project and each other project in the plurality of software development projects.

7. The method of claim 1, wherein the snapshot metrics include a respective age of each project, and further comprising: computing a difference between an age of the primary software development project and each other project in the plurality of software development projects.

8. The method of claim 1, wherein the snapshot metrics include a measure of project activeness, wherein the measure of project activities represents a frequency of revisions of a project over one or more periods of time, and further comprising: computing a difference between a measure of project activeness for the primary software development project and each other project in the plurality of software development projects.

9. The method of claim 1, wherein the snapshots metrics include a measure of project size, and further comprising: computing a difference between a measure of project size for the primary software development project and each other project in the plurality of software development projects.

10. The method of claim 1, wherein the functionality metrics include a measure of overlapping functional dependencies between software development projects, and further comprising: computing a respective measure of overlapping functional dependencies between the primary software development project and each other project in the plurality of software development projects.

11. The method of claim 1, wherein the functionality metrics include a measure of overlapping programming construct identifiers, and further comprising: computing a respective measure of overlapping programming construct identifiers between the primary software development project and each other project in the plurality of software development projects.

12. The method of claim 11, wherein the request for the similarity grouping is a request to rank the primary software development project relative to one or more other projects in the similarity grouping, and further comprising: computing a respective similarity score between the primary software development project and each other project in the similarity grouping; ranking software development projects in the similarity grouping according to the computed similarity scores; and providing data identifying one or more highest-ranked projects in response to the request.

13. The method of claim 1, further comprising: generating a presentation that displays projects in the similarity grouping according to at least two other metrics.

14. The method of claim 13, wherein the two other metrics include a size and a measure of quality of each software development project.

15. The method of claim 14, further comprising displaying a presentation that ranks software development projects in the similarity grouping.

16. The method of claim 15, wherein the presentation ranks the software development projects in the similarity grouping by size or by a measure of quality.

17. The method of claim 1, further comprising: receiving an indication that a user is browsing the primary software development project; and in response, generating a user interface presentation that includes a suggestion for the user to work on or browse one or more other projects in the similarity grouping for the primary software development project; and generating a suggestion that the user work on a highest-ranking project in the similarity grouping.

18. The method of claim 1, further comprising: receiving an indication that a user has requested a particular property of the primary software development project; and in response, generating a user interface presentation that presents information comparing the particular property of the primary software development project to one or more other projects in the similarity grouping for the primary software development project.

* * * * *